(12) United States Patent
Kawabata (10) Patent No.: US 8,011,826 B2
(45) Date of Patent: Sep. 6, 2011

(54) PHANTOM

(75) Inventor: Ken-ichi Kawabata, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 33 days.

(21) Appl. No.: 11/812,769

(22) Filed: Jun. 21, 2007

(65) Prior Publication Data

US 2008/0013593 A1    Jan. 17, 2008

(30) Foreign Application Priority Data

Jun. 21, 2006   (JP) .................................. 2006-171744

(51) Int. Cl.
*G01N 25/00* (2006.01)
*G09B 23/00* (2006.01)
(52) U.S. Cl. ............................. 374/17; 374/27; 424/9.52
(58) Field of Classification Search .................... 374/17, 374/27; 424/9.52
See application file for complete search history.

(56) References Cited

U.S. PATENT DOCUMENTS

| 2001/0019710 A1 | 9/2001 | Berg et al. | |
| 2003/0039613 A1* | 2/2003 | Unger et al. | 424/9.51 |
| 2008/0019923 A1* | 1/2008 | Kawabata et al. | 424/9.52 |
| 2008/0319375 A1* | 12/2008 | Hardy | 604/22 |

FOREIGN PATENT DOCUMENTS

JP    4-332541    5/1991

OTHER PUBLICATIONS

Lafon, Cyril et al. "Development and Characterization of an Innovative Synthetic Tissue-Mimicking Material for High Intensity Focused Ultrasound (HIFU) Exposures", IEEE Ultrasonics Symposium, 2001, pp. 1295-1298.
Wen-Shiang Chen, et al., "Mechanisms of Lesion Formation in High Intensity Focused Ultrasound Therapy", Center for Industrial and Medical Ultrasound, University of Washington, Seattle, WA (USA), 98105, 2002 IEEE Ultrasonics Symposium pp. 1443-1446.

* cited by examiner

*Primary Examiner* — Lisa M Caputo
*Assistant Examiner* — Mirellys Jagan
(74) *Attorney, Agent, or Firm* — Stites & Harbison PLLC; Juan Carlos A. Marquez, Esq.

(57) ABSTRACT

This invention provides an ultrasonic phantom that can respond to different ultrasonic intensities. Such ultrasonic phantom comprises a gel comprising a low-boiling compound in the form of droplets sealed therein. The invention also provides an assay technique using such phantom. This invention enables regulation of components of droplets, droplet size, and the ultrasonic intensity at which droplets are vaporized upon mixing of droplets with different sizes. This enables visualization of whether or not ultrasound beams that exceed relevant different ultrasonic intensities have been applied.

12 Claims, 10 Drawing Sheets

PHANTOM

CLAIM OF PRIORITY

The present application claims priority from Japanese application JP 2006-171744 filed on Jun. 21, 2006, the content of which is hereby incorporated by reference into this application.

BACKGROUND OF THE INVENTION

1. Technical Field

The present invention relates to a phantom that indicates a dose of ultrasound beams radiated from an ultrasonic device used for measurement, diagnosis, medical treatment, or other purposes.

2. Prior Art

In recent years, great importance tends to be attached to the quality of life of a patient after medical treatment for a disease. In the case of serious diseases such as cancer, the social demand for minimally invasive therapeutic methods is also increasing. At present, endoscopic operations or laparoscopic operations that involve insertion of a tubular guide into the body or radio-wave cautery that involves insertion of a needle-like therapeutic instrument into the body are mainly employed as minimally invasive treatment techniques in clinical practice, although such techniques involve invasion of the body with an instrument. In contrast, ultrasound beams can converge in an area of 1 cm×1 cm or smaller in the body from the outside of the body without insertion of an instrument into the body, based on the relation between wavelength and attenuation inside body. With the utilization of such properties, clinical application of minimally invasive ultrasonic therapy has begun. At present, the most clinically advanced ultrasonic therapeutic technique is the high-intensity focused ultrasound (HIFU) therapy, which is targeted at treating hysteromyoma and breast carcinoma. This therapeutic technique involves irradiation of an affected area with high-intensity focused ultrasound (HIFU) to raise the temperature at the affected area to a protein aggregation temperature or higher within several seconds, thereby cauterizing the tissue at the affected area. In addition to HIFU therapy, the following ultrasonic therapeutic techniques are available; for example, sonodynamic therapy that involves cauterization of a target such as a tumor using active oxygen resulting from a phenomenon referred to as acoustic cavitation with the utilization of the interaction between a sensitizer and a ultrasonic beam and ultrasound-accelerated drug therapy, which is intended to accelerate drug efficacy by improving the ability of a drug to permeate an affected area with the use of ultrasound beams in combination with an existing drug.

In these therapeutic techniques involving the use of ultrasound beams, an ultrasonic generator is not brought into contact with the area to be treated. This requires monitoring of the area of treatment via a diagnostic imaging apparatus or the like. In addition to monitoring, it is important that a treatment plan be designed in advance so as to apply an adequate dose of ultrasound beams to the area of treatment and so as to prevent an inadequately large dose of ultrasound beams from irradiating areas other than the area of treatment, in order to more accurately perform selective treatment.

A treatment plan refers to predetermination of an area that is to be irradiated with ultrasound beams. In order to confirm the effectiveness of the plan and whether or not the apparatus would function as planed, it is required to prepare an ultrasonic phantom that can mimic a living organism and that is constructed to indicate the degree of ultrasonic irradiation. It is also necessary to irradiate the ultrasonic phantom with ultrasound beams to confirm the conditions of ultrasonic irradiation with the use of the ultrasonic phantom, prior to the application of the treatment plan to a human body.

Up to the present, an ultrasonic phantom that allows visualization of secondary actions resulting from ultrasonic application instead of ultrasonic energy has been devised as ultrasonic phantom as mentioned above. An example thereof is an ultrasonic phantom that uses a soluble protein as an indicator to detect temperature increase resulting from ultrasonic irradiation (C. Lafon et al., Proc., IEEE Ultrasonics Symposium, pp. 1295-1298, 2001). This utilizes the phenomenon whereby a protein is solidified and aggregated upon thermal denaturation, which increases the light scattering intensity compared with that before denaturation. Also, with the utilization of the phenomenon whereby a substance having a higher oxidizing power, such as a hydroxyl radical, is generated as a result of acoustic cavitation upon ultrasonic irradiation, a reaction substrate that develops color upon oxidation may be used as an indicator to detect the degree of chemical reactions caused by ultrasonic irradiation (JP Patent Publication (kokai) No. H04-332541 A (1992)).

SUMMARY OF THE INVENTION

Ultrasonic phantoms that had been used in the past involved the use of secondary actions such as temperature change or chemical reactions resulting from ultrasonic irradiation. In general, such secondary actions required an irradiation time of 1 to several seconds. Thus, application thereof was difficult for short ultrasonic pulses. Since detection was performed upon protein denaturation or chemical reactions, what could be determined based thereon was whether or not the ultrasonic irradiation exceeded a given dose. When a temperature change was to be detected based on protein denaturation, for example, what could be determined was whether or not a temperature was not higher than or not lower than a temperature at which a protein could be denatured within several seconds (i.e., about 70° C.). Even if the application of an adequate or greater dose of ultrasound beams was detected at the affected area, accordingly, it was difficult to detect the dose of ultrasonic irradiation at areas other than the affected area; i.e., it was difficult to determine whether or not the dose of ultrasonic irradiation at such areas was sufficiently small. When the oxidization reaction caused by a substance having a high oxidizing power was used, radicals are involved in the reaction, which exist even after the ultrasound exposure and, the remaining radicals proceed reaction and terminate only when reaction substrates are all consumed. Accordingly, the quantities of radicals initially generated by ultrasonic irradiation would not affect the final reaction yield at more than 10 minutes after the ultrasonic irradiation. If ultrasound beams were applied with varied intensity, what could be learned therefrom was qualitative information concerning the generation of radicals, and it was difficult to attain quantitative information concerning ultrasonic intensity.

The present invention is intended to provide an ultrasonic phantom that causes optical changes upon ultrasonic irradiation of a given intensity or higher. It can be applied to shorter pulses and can arbitrarily change ultrasonic intensity, which causes optical changes.

The ultrasonic phantom according to the present invention is composed of a bubble-forming component comprising volatile liquid droplets and a matrix comprising the bubble-forming component uniformly dispersed therein. The droplets contained in the ultrasonic phantom of the present invention may comprise therein such volatile liquid and, as the outer envelope, a surfactant and a droplet stabilizer. Alternatively, the ultrasonic phantom of the present invention may be composed of a bubble-forming component comprising volatile liquid droplets, an indicator of temperature increase that irreversibly causes optical changes upon temperature increase, and a matrix that comprises the bubble-forming component and the indicator of temperature increase uniformly dispersed therein.

Specifically, the present invention provides a phantom comprising: a thermally-irreversible gel; a contrast medium accommodated in the gel that causes a shift from a liquid phase to a gas phase upon ultrasonic irradiation; and a container that accommodates the thermally-irreversible gel and the contrast medium.

In one embodiment, the contrast medium comprises volatile liquid. When the volatile liquid is in a liquid phase, the contrast medium comprises first droplets having an average particle diameter of 0.5 μm or smaller and second droplets having an average particle diameter greater than 0.5 μm and 20 μm or less. Preferably, the second droplets account for 50% or more of the contrast medium by weight.

The thermally-irreversible gel is composed of a first area, which includes the focal point of the ultrasonic irradiation, and a second area, which does not include such focal point. In the first area, the second droplets account for 50% or more of the contrast medium by weight. In the second area, the second droplets account for 0% to 10% of the contrast medium by weight.

According to a given embodiment, the contrast medium comprises an outer envelope comprising a surfactant and a droplet stabilizer. Also, the contrast medium may shift from a gas phase to a liquid phase upon cooling after ultrasonic irradiation.

Examples of the volatile liquid include fluorotrichloromethane, dibrodifluoromethane, 2-bromo-1,1,1-trifluoroethane, 2-methylbutane, perfluoropentane, 1-pentene, pentane, 2H,3H-perfluoropentane, perfluorohexane, hexane, 1H-perfluorohexane, perfluoroheptane, heptane, and perfluorooctane.

The phantom of the present invention may further comprise an indicator of temperature increase accommodated in the thermally-irreversible gel. In one embodiment, the indicator of temperature increase is a protein.

The present invention also provides a method for assaying ultrasonic irradiation conditions comprising the steps of:

applying ultrasound beams to a phantom comprising a thermally-irreversible gel, an indicator of temperature increase accommodated in the gel, and a contrast medium that shifts from a liquid phase to a gas phase upon ultrasonic irradiation and shifts from a gas phase to a liquid phase upon cooling after ultrasonic irradiation;

attaining first detection results by optically detecting denaturation of the indicator of temperature increase resulting from ultrasonic irradiation and a shift of the contrast medium from a liquid phase to a gas phase;

cooling the phantom following the step of ultrasonic irradiation;

attaining second detection results by optically detecting a shift of the contrast medium from a gas phase to a liquid phase following the step of cooling; and comparing phase shifts of the contrast medium based on the first and the second detection results to assay the ultrasonic irradiation conditions based on the results of comparison. In the step of cooling, for example, the phantom is cooled to −20° C. to 10° C.

Effects Of The Invention

The ultrasonic phantom of the present invention can respond to ultrasonic beams of short pulses to ultrasonic beams of continuous waves and can respond to ultrasound beams of different intensities for visualization of the intensity of the applied ultrasound beams.

PREFERRED EMBODIMENTS OF THE INVENTION

In conventional ultrasonic phantoms, the principal how the ultrasound-exposed area is visualized disables quantitative visualization of the differences in acoustic properties such as acoustic intensity. In the case of a phantom that allows visualization of aggregation resulting from protein denaturation, the temperature at which a water-soluble protein is aggregated within several seconds is between approximately 60° C. and 70° C., and the degree of protein aggregation is insufficient at temperatures outside such range. Thus, such phantom is less useful. When the amount of generated substances having a high oxidizing power is intended to be visualized, a radical reaction is sequentially continued after the termination of ultrasonic irradiation until the reaction substrate is eliminated, even if the amounts of the substances generated upon ultrasonic irradiation vary because of different conditions such as ultrasonic intensity. This complicates the visualization of variations resulting from different ultrasonic conditions.

The present inventors accordingly considered that a novel phantom having a principle different from that of a conventional phantom would be required in order to resolve the above-described problem and conducted studies in this respect. The present inventors focused on optical changes resulting from a shift from a liquid phase to a gas phase. While the liquid medium contains microparticles including liquids different from the medium and the liquid molecules in the microparticles are converted to gas, in general, volume is raised to approximately three orders of magnitude due to differences between the density of a substance in the liquid state and gas state that corresponds thereto. Since nanoparticles can be substantially spherical, the volume would be proportional to the diameter raised to the third power. When volume is raised to approximately the third power, accordingly, the diameters of the microparticle grow an order of magnitude. The scattering cross area, which is an indicator of the scattering intensity, is proportional to the radius raised to the second power. If the liquid-containing microparticles are shifted to a gas phase via ultrasonic irradiation, accordingly, an increased scattering cross area would enable visualization of the areas that have been irradiated selectively with ultrasound beams. The present inventors discovered that superheating would be suitable for shifting a liquid phase to a gas phase via ultrasonic irradiation. As demonstrated by the Kelvin's equation:

$$\log(p\_r/p)=-2\gamma M/\rho rRT$$

wherein p represents vapor pressure at a horizontal surface; p_r represents vapor pressure of a microparticle having a radius r; M represents molar mass; γ represents surface tension; ρ represents concentration of liquid; and T represents the absolute temperature, the vapor pressure of liquid becomes smaller as the radius thereof is decreased in the state of a microparticle. Thus, an apparent boiling point is increased as the radius is decreased. However, the vapor pressure is returned to a general state if an increased apparent boiling point is disturbed by external energy. With the utilization thereof, volatile liquid can be converted to droplets using a surfactant at a temperature sufficiently lower than the boiling point, and droplets can be bubbled via ultrasonic irradiation at around the boiling temperature or at higher temperatures. By causing such bubbling in a highly transparent medium containing droplets sealed therein, the target ultrasonic phantom can be obtained.

Specifically, the ultrasonic phantom of the present invention is composed of a bubbling component comprising volatile liquid droplets and a matrix comprising such bubbling components uniformly dispersed therein. The volatile liquid contained in the bubbling component of the ultrasonic phantom of the present invention is preferably maintained in the matrix while stabilizing droplets. Table 1 shows examples of volatile liquids preferable as bubbling components. The droplets contained in the ultrasonic phantom of the present invention comprise the volatile liquid and, as an outer envelope, a surfactant and a droplet stabilizer. Types of surfactants are not particularly limited, and a low-molecular-weight or high-molecular-weight and anionic, cationic, or nonionic surfactant, a phospholipid, or a protein can be used. The matrix of the ultrasonic phantom of the present invention is not particularly limited, provided that the droplets can be spatially uniformly disposed. A liquid or solid matrix may be used. As a liquid matrix, a highly viscous polyhydric alcohol is preferable. Also, a gel can be used as the matrix of the ultrasonic phantom of the present invention. Gel is classified into a thermally-reversible gel that requires a temperature-changing operation such as heating or cooling at the time of preparation and a thermally-irreversible gel. In the present invention, a gel comprises volatile liquid droplets. Thus, the latter thermally-irreversible gel is more preferable.

TABLE 1

| Volatile liquid | Boiling point (° C.) |
|---|---|
| Fluorotrichloromethane | 24 |
| Dibrodifluoromethane | 25 |
| 2-bromo-1,1,1-trifluoroethane | 26 |
| 2-methylbutane | 27.8 |
| Perfluoropentane | 29.5 |
| 1-pentene | 30 |
| Pentane | 36 |
| 2H,3H-perfluoropentane | 53.6 |
| Perfluorohexane | 56.6 |
| Hexane | 69 |
| 1H-perfluorohexane | 70 |
| Perfluoroheptane | 82.5 |
| Heptane | 98.3 |
| Perfluorooctane | 105 |

The present inventors discovered the following. The droplets sealed in the thermally-irreversible gel (i.e., a contrast medium) are subjected to phase-shift via ultrasonic irradiation to generate bubbles, the bubbles are cooled, and the generated bubbles are reconverted to droplets. Based on this finding, the present inventors have developed an ultrasonic phantom, which is a dosemeter that measures the applied ultrasonic intensity and that can measure temperature increase resulting from ultrasonic irradiation, and they considered that dose measurements using the same would be feasible. The matrix can also comprise an indicator of temperature increase that causes irreversible optical changes upon temperature increase. Thus, the distributional conditions of doses and the distributional conditions of temperature change can be compared based on phantom measurements before and after temperature changes. The ultrasonic phantom for measuring the ultrasonic intensity and temperature increase caused by ultrasonic application may be composed of a bubbling component comprising volatile liquid droplets, an indicator of temperature increase that causes irreversible optical change due to temperature increase, and a matrix that comprises the bubbling component and the indicator of temperature increase uniformly dispersed therein. The indicator of temperature increase that causes irreversible optical change due to temperature increase is not particularly limited, as long as it is uniformly miscible with the bubbling component and the matrix. A protein that is whitened upon thermal denaturation is preferable. Specifically, a solution containing a large quantity of proteins such as albumin, egg albumen, or blood serum (from which a given protein may or may not be separated) can be used.

EXAMPLES

Hereafter, test examples and examples of the present invention are described in greater detail, although the technical scope of the present invention is not limited thereto.

Droplets comprising a phospholipid as the outer envelope and comprising perfluorocarbon were incorporated into a polyacrylamide gel, and ultrasound beams were applied thereto. Changes resulting therefrom were tested. Droplets comprising perfluorocarbons and substances of similar properties are referred to as contrast media herein. In advance, a phantom as a test sample was prepared in the following manner.

(Preparation of Droplets)

The ingredients shown below were added together while being maintained at 4° C., and the resulting mixture was homogenized using the Ultra-Turrax T25 (Janke & Kunkel, Staufen, Germany) at 9,500 rpm at freezing temperature for 1 minute while slowly adding 20 ml of phosphate buffer (pH=7.4) thereto.

| | |
|---|---|
| Glycerol | 2.0 g |
| α-Tocopherol | 0.02 g |
| Cholesterol | 0.1 g |
| Lecithin | 1.0 g |
| Perfluoropentane | 0.2 g |

Figure 1:
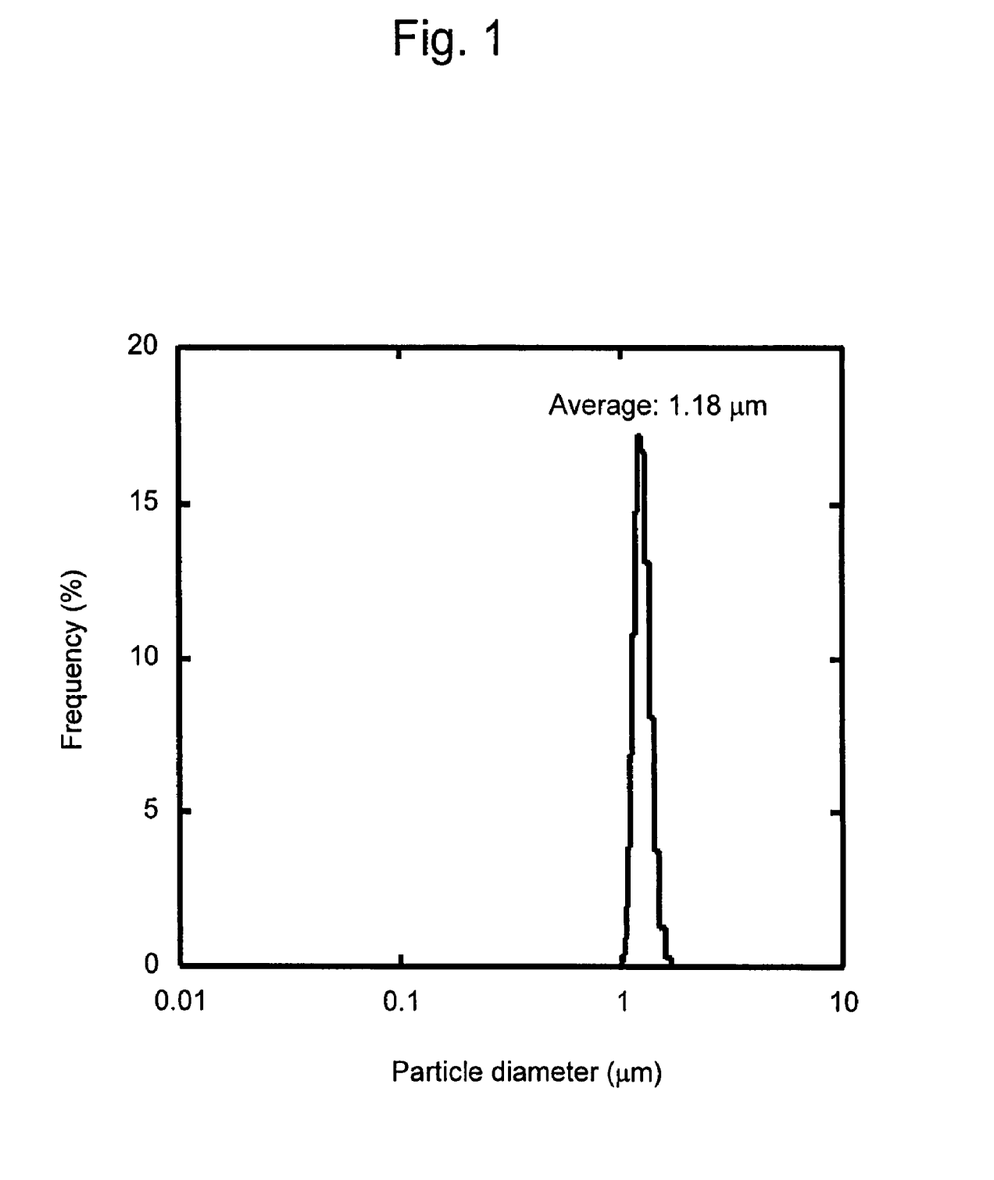
FIG. 1 shows an example of particle diameter distribution of droplets used for the ultrasonic phantom of the present invention.

The resulting emulsion was subjected to high-pressure emulsification in the Emulsiflex-C5 (Avestin, Ottawa, Canada) at 20 MPa for 1 minute, and the resultant was filtered through a 5-μm membrane filter. Further, the filtrate was centrifuged at 5,000 G for 5 minutes, the supernatant was removed, phosphate buffer (pH=7.4) in an amount equivalent to the amount of the removed supernatant was added, and the resultant was subjected to redispersion using a vortex mixer for 30 seconds. The particle diameter distribution of the resulting emulsion droplets was assayed using LB-550 (Horiba Seisakusho, Tokyo, Japan). Examples of the results are shown in FIG. 1. Emulsion droplets having an average particle diameter of 1.18 μm were obtained. The pore size of the membrane filter to be used, the gravity and the duration of centrifugation, and the numbers of times of filtering and of centrifugation can be changed to obtain emulsion droplets having average particle diameters of about 0.1 μm to about 5 μm. Alternatively, the aforementioned high-pressure emulsification was performed at 0.1 MPa (atmospheric pressure) instead of 20 MPa, and emulsion droplets having average particle diameters of about 5 μm to about 20 μm were obtained. The concentration of perfluoropentane contained in the emulsion droplets was assayed using a gas chromatograph G-6000 (Hitachi High-Technologies, Ibaraki, Japan; column: Gaskuropack 54 80/100). Instead of lecithin, sodium dodecyl sulfate and Triton X100 were used, and emulsion droplets having substantially equivalent particle diameter were obtained.

(Sealing of Droplets into Gel)

(1) Preparation of Gel that Does Not Contain an Indicator of Temperature Increase All the following procedures were performed at 4° C. The emulsion (5 ml) containing the droplets with an average particle diameter of 1.18 μm (perfluoropentane concentration: 10 mM), 86.5 ml of water, and 25 ml of a 40% acrylamide solution (acrylamide:bisacrylamide=39:1) were thoroughly mixed and poured into a rectangular container. While slowly agitating the solution with a stirrer, 7.5 ml of a 10% ammonium persulfate solution and 10 ml of N,N,N',N'-tetramethylethylenediamine were quickly added and homogeneously mixed. Upon termination of agitation, the stirrer rod was removed, the rectangular container was covered, and the container was allowed to stand for 20 minutes. Thus, a substantially transparent gel was prepared.

(2) Preparation of Gel that Contains an Indicator of Temperature Increase

All the following procedures were performed at 4° C. The emulsion (5 ml) containing the droplets of the average particle diameter of 1.18 μm (perfluoropentane concentration: 10 mM), 86.5 ml of a 5% bovine serum albumin solution, and 25 ml of a 40% acrylamide solution (acrylamide:bisacrylamide=39:1) were thoroughly mixed, and the mixture was poured into a rectangular container. While slowly agitating the solution with a stirrer, 7.5 ml of a 10% ammonium persulfate solution and 10 ml of N,N,N',N'-tetramethylethylenediamine were quickly added and homogeneously mixed. Upon termination of agitation, the stirrer rod was removed, the rectangular container was covered, and the container was allowed to stand for 20 minutes. Thus, a substantially transparent gel was prepared.

Test Example 1

Effects of Ultrasonic Irradiation with Different Acoustic Intensity

Figure 2:
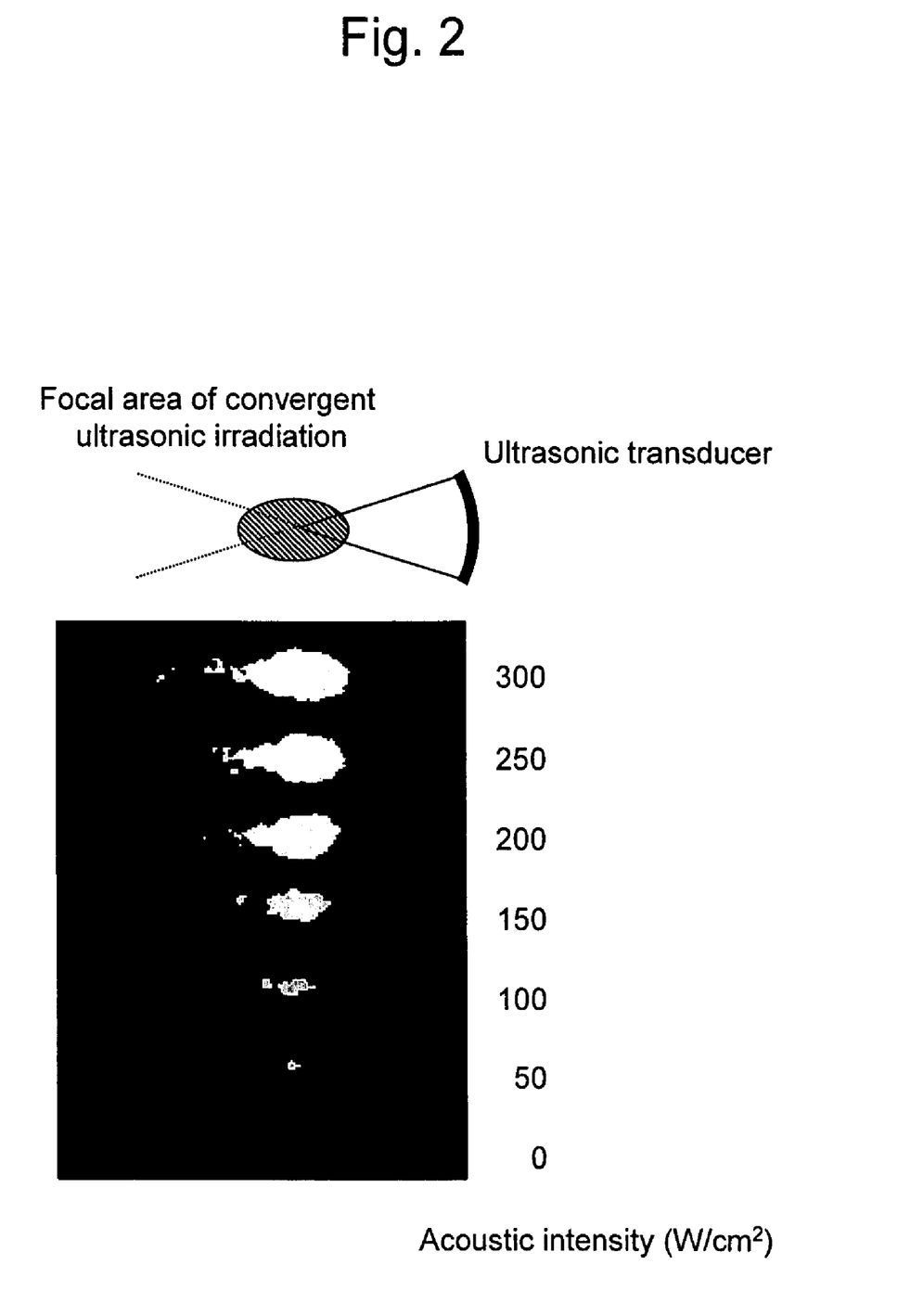
FIG. 2 shows an example of an optical image obtained after sealing the droplets used for the ultrasonic phantom of the present invention in the gel and applying convergent ultrasound beams thereto.

The gel prepared in accordance with the method described in (1) above was maintained at 37° C., the gel was brought into close contact with a converging ultrasonic transducer having a diameter of 24 mm and an F number of 1 in such state, the acoustic intensity was varied from 0 to 300 W/cm$^2$, and the gel was irradiated with 4 periods of 4 MHz ultrasound beams. An overview of the gel is shown in FIG. 2. FIG. 2 is a binary picture obtained by placing the gel irradiated with ultrasound beams on a black plate, photographing the gel, and binarizing the photograph via image processing. When the acoustic intensity was 0 (without ultrasonic irradiation), the gel remained black. This indicates that the gel is substantially optically transparent. When the gel was irradiated with ultrasound beams, however, the areas around the focal point were whitened. The whitened areas became larger as the ultrasonic intensity became higher. This demonstrates that the gel used in this test example is whitened at a site that has been irradiated with ultrasound beams of a given intensity or higher (an acoustic intensity of 50 W/cm$^2$ in the case of FIG. 2). Substantially the same effects were attained when the duration of ultrasonic irradiation was changed from 4 periods to 10 seconds (equivalent to about 4×10$^7$ periods). Also, substantially the same results were attained using the gel prepared in accordance with the method described in (2) above.

Test Example 2

Figure 3:
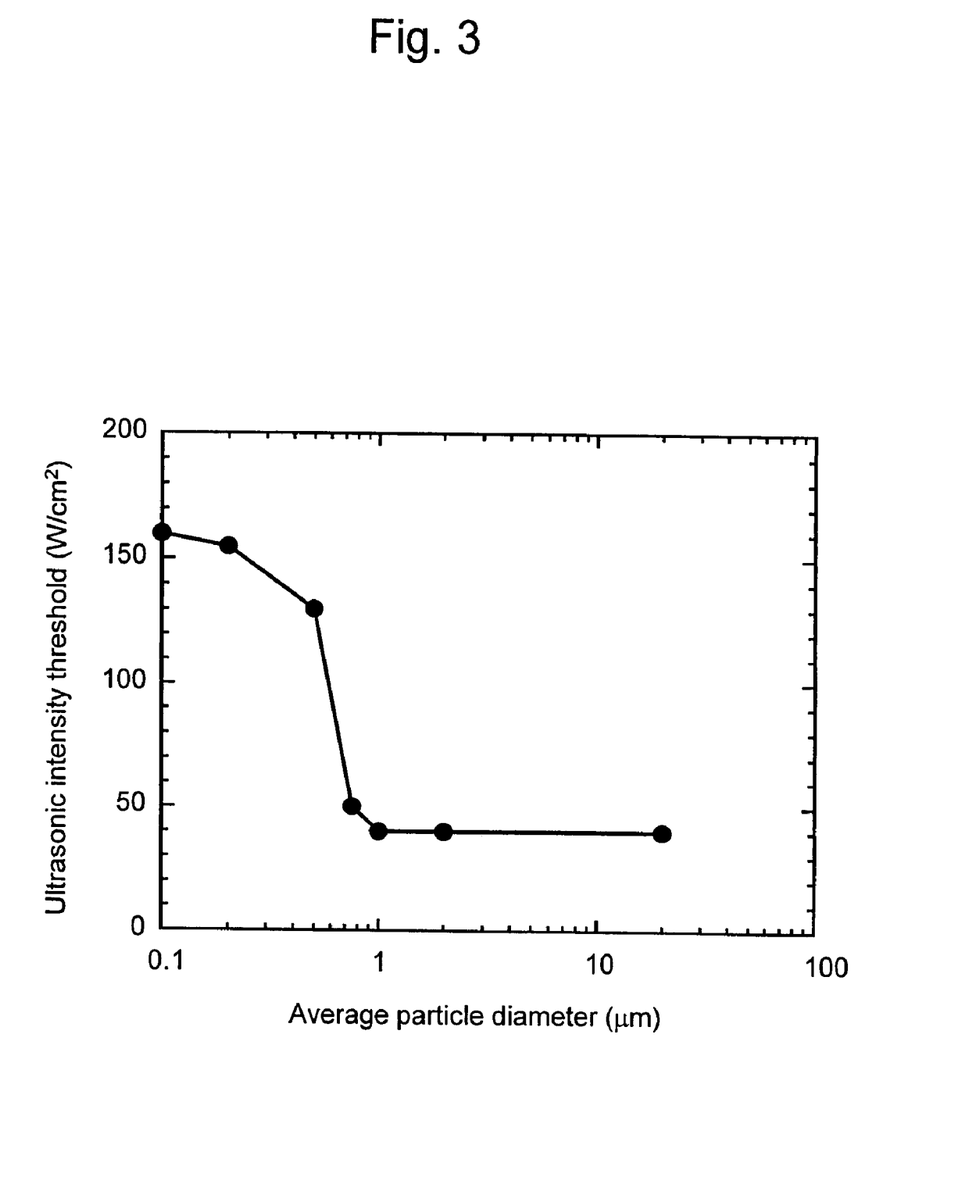
FIG. 3 shows an example of the results of assaying the ultrasonic intensity threshold that causes the gel to optically change when the particle diameters of the droplets in the gel used for the ultrasonic phantom of the present invention are varied.
Figure 4:
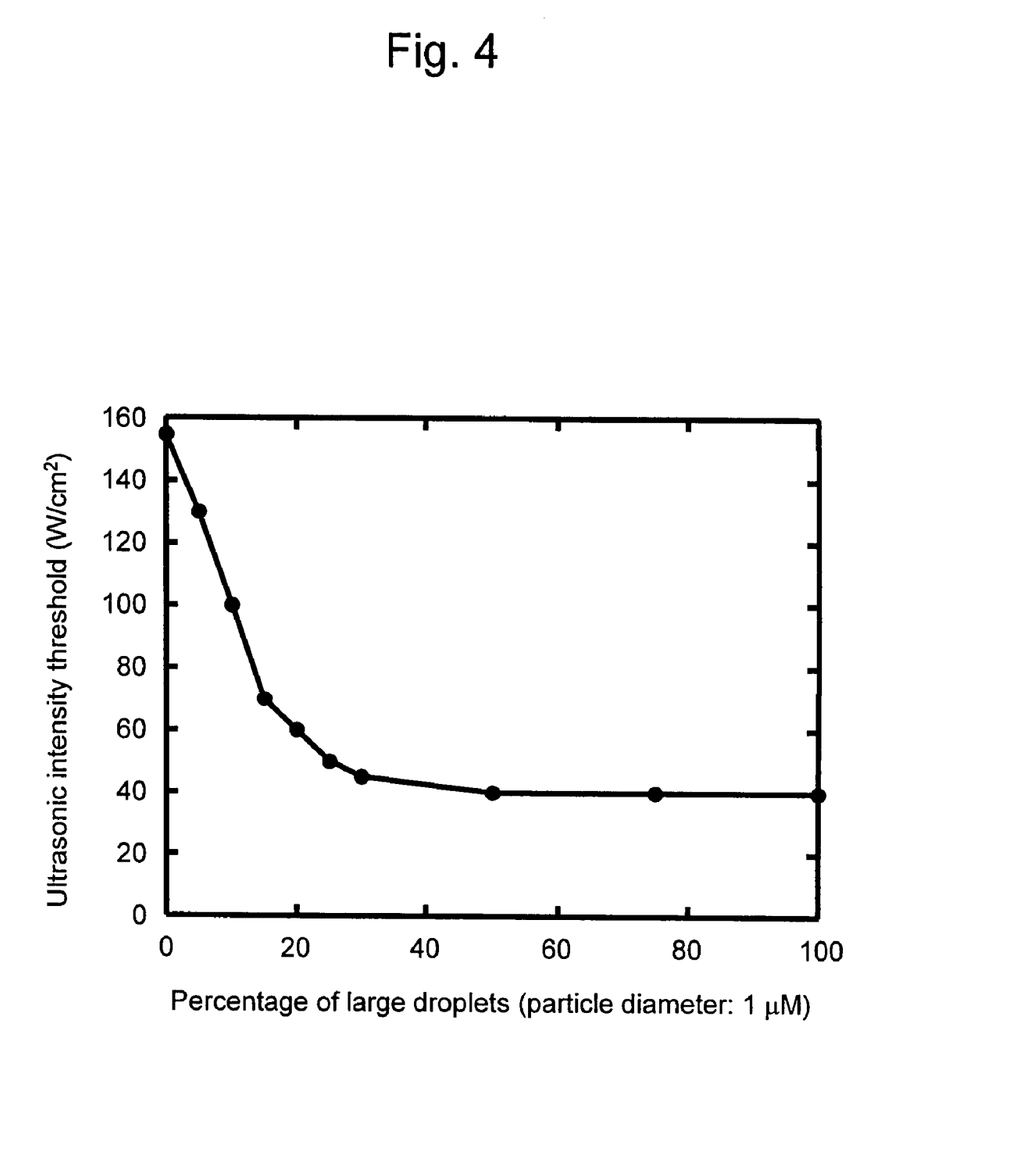
FIG. 4 shows an example of the results of assaying the ultrasonic intensity threshold that causes the gel to optically change when large droplets (particle diameter: 1 μm) are mixed with small droplets (particle diameter: 0.2 μm) at different percentages and sealed in the gel used for the ultrasonic phantom of the present invention.
Figure 5:
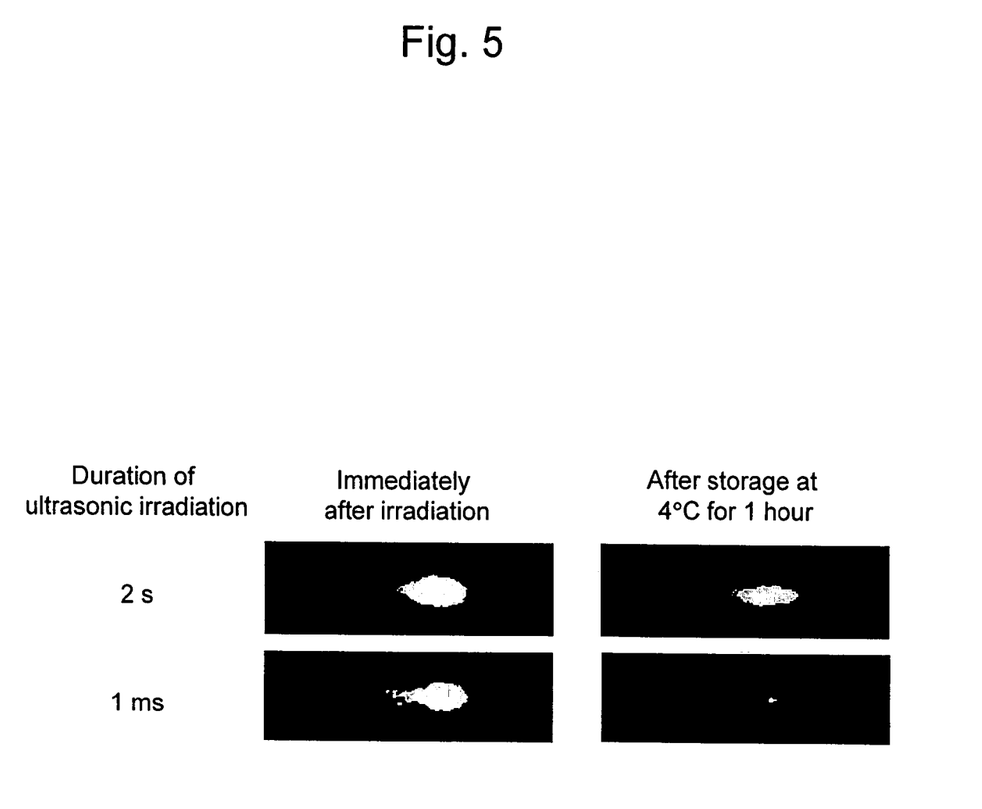
FIG. 5 shows the phantom immediately after ultrasonic application and low-temperature treatment of the gel used for the ultrasonic phantom of the present invention.
Figure 6:
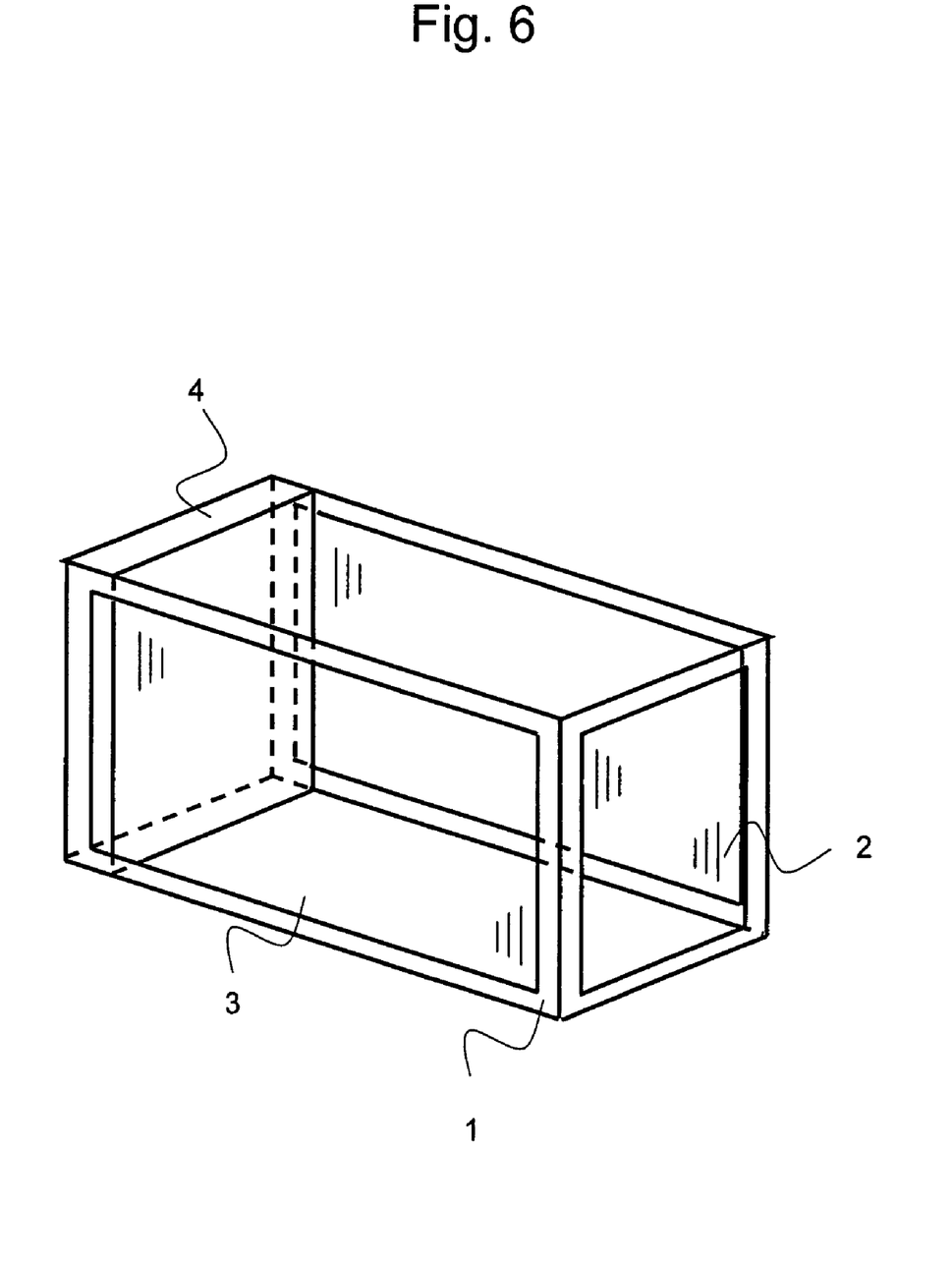
FIG. 6 shows an outer frame of the ultrasonic phantom according to an example of the present invention.

Test of Changes in Sensitivity to Ultrasound Beams when Droplet Sizes are Changed As described above, droplet sizes can be varied in accordance with conditions for preparing droplets. FIG. 3 shows an example of the results of inspecting the ultrasonic intensity dependence resulting from changes in the gel shown in FIG. 2 when droplets having different average particle diameters are sealed in the gel. The conditions for ultrasonic irradiation were the same as in Test Example 1. The horizontal axis of FIG. 3 logarithmically represents an average particle diameter, and the vertical axis represents the minimal ultrasonic intensity (the ultrasonic intensity threshold) resulting from changes in the gel shown in FIG. 2. When the average particle diameter was 0.5 μm or smaller, the ultrasonic intensity threshold was as high as about 130 to 160 W/cm$^2$. When the average diameter was greater than 0.5 μm, there was substantially no particle diameter dependence, and the ultrasonic intensity threshold was about 40 W/cm$^2$. This demonstrates that the sensitivity to ultrasound beams can be varied depending on whether or not the particle diameter of the gel used in this test is smaller than or greater than 0.5 μm (substantially the same results were attained using the gel prepared in accordance with the method described in (2) above).

Test Example 3

Figure 8:
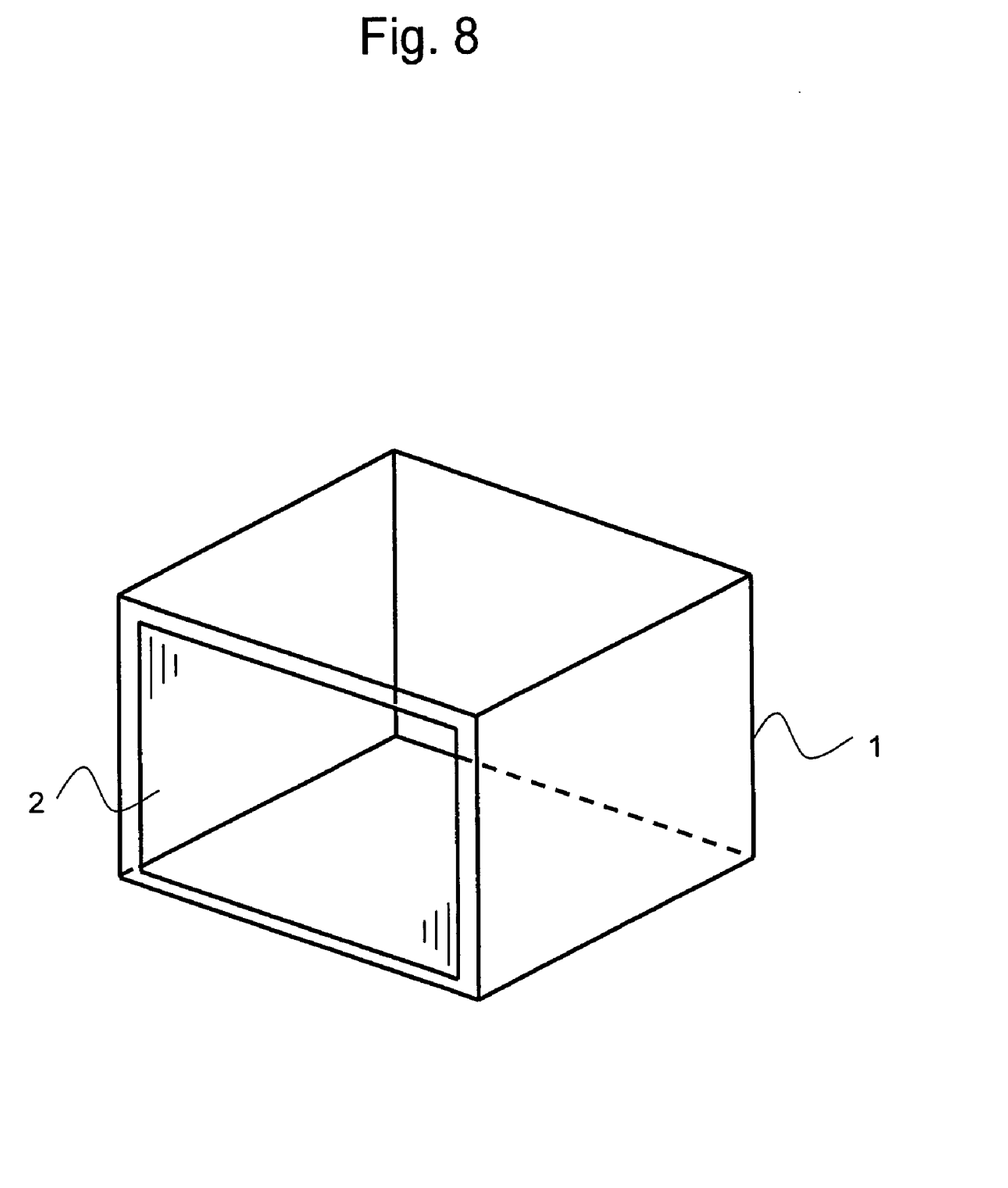
FIG. 8 shows an outer frame of the ultrasonic phantom according to an example of the present invention.
Figure 9:
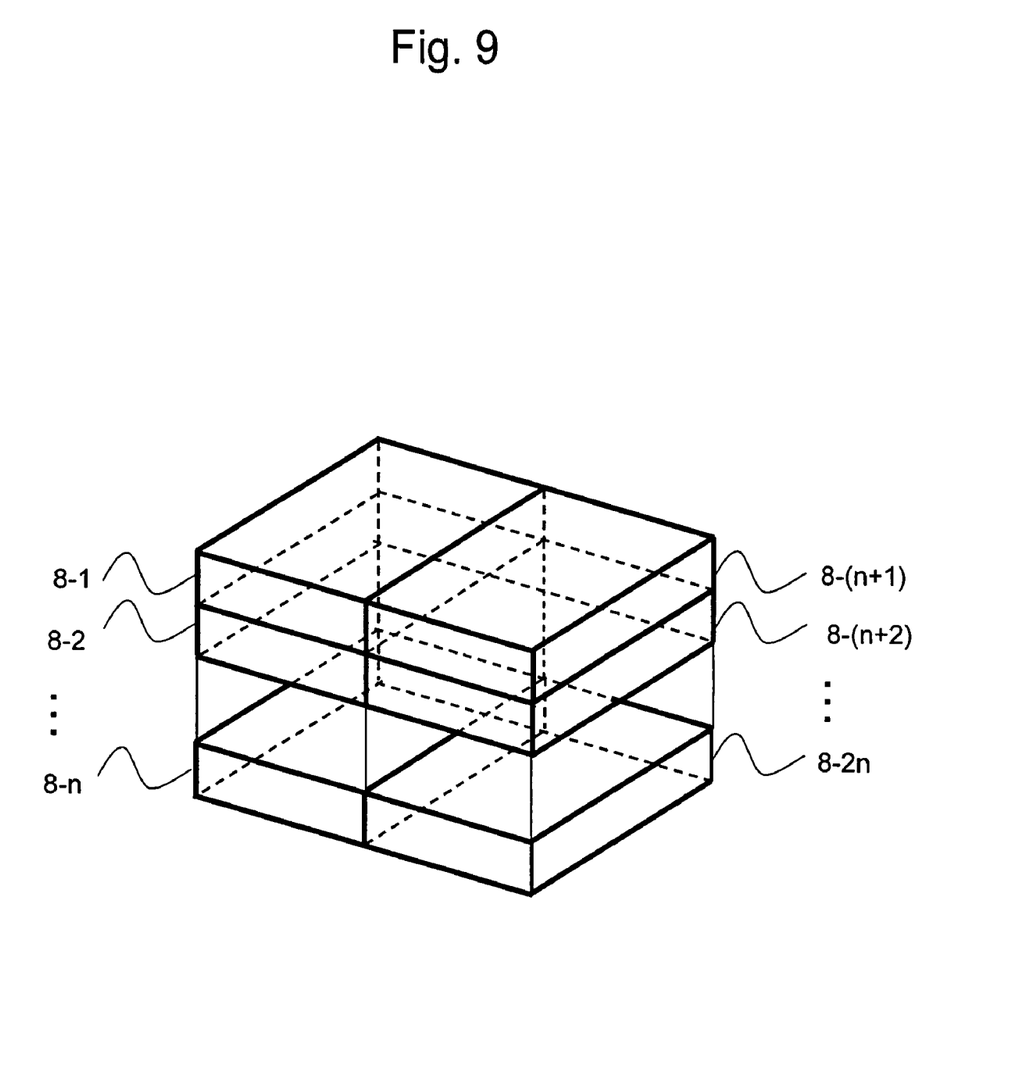
FIG. 9 shows a gel, which is the ultrasonic phantom body according to an example of the present invention.

Test of Sensitivity to Ultrasound Beams when Mixing Droplets Having Different Particle Diameters As the particle diameters vary, sensitivity to ultrasound beams also changes as shown in FIG. 3, and such change is rapid relative to particle diameters. In order to precisely alter sensitivity to ultrasound beams, small droplets with low sensitivity to ultrasound beams (e.g., with particle diameters of 0.2 μm) were mixed with large droplets having larger particle diameters (e.g., particle diameters of 1 μm) and higher sensitivity to ultrasound beams than the small droplets at different percentages to prepare droplet groups, and ultrasonic intensity thresholds were determined in the same experimental systems that were used in Test Examples 1 and 2 in the same manner as in Test Example 2, except for the use of the prepared droplet groups. FIG. 4 shows an example of the determined results. The horizontal axis of FIG. 4 represents the percentage of large particles out of all droplets and the vertical axis represents the ultrasonic intensity at which the gel comprising the droplets sealed therein changes as shown in FIG. 2. This figure indicates that the ultrasonic intensity thresholds vary depending on the percentage of large particles and that the thresholds become lower as the percentage of large particles is increased, when the large particles account for 0% to 50% of all droplets by weight. Such changes are sufficiently mild relative to changes in percentage, and adjustment of the percentage enables precise regulation of the sensitivity of the gel to ultrasound beams. Similar effects were attained in an experiment that was carried out by varying the sizes of large droplets in the range between 0.7 μm and 20 μm. Similar results were also attained when the sizes of small droplets were varied in the range between 0.1 μm and 0.5 μm. Also, perfluoropentane in the droplets was substituted with perfluorohexane or perfluoroheptane, a similar experiment was carried out, and substantially the same results were attained. Furthermore, substantially the same results were attained using the gel prepared in accordance with the method described in (2) above.

This test example demonstrates that the gel of the present invention that comprises droplets sealed therein has regulated sensitivity to ultrasound beams, and optical changes would occur with the application of ultrasound beams at a given intensity or higher.

Test Example 4

Test Example Regarding a Step of Obtaining Information Concerning Ultrasonic Intensity Using gel Containing an Indicator of Temperature Increase and Information Concerning Temperature Increase The gel prepared in accordance with the method described in (2) above was maintained at 37° C., the gel was brought into close contact with a converging ultrasonic transducer having a diameter of 24 mm and an F number of 1 in such state, 4 MHz ultrasound beams with acoustic intensity of 300 W/cm$^2$ were applied for 1 ms or 2 s, and the gel was cooled to 4° C. immediately thereafter. The temperature was maintained at 4° C. for 1 hour and returned to room temperature, and an overview of the gel is shown in FIG. 5. FIG. 5 is a binary picture obtained by placing the gel irradiated with ultrasound beams on a black plate, photographing the gel, and binarizing the photograph via image processing. Regardless of the duration of ultrasonic irradiation, the focal area was whitened immediately after ultrasonic irradiation. When the duration of ultrasonic irradiation was 2 s, the site irradiated with ultrasound beams remained white even when it was treated at 4° C. This indicates that the temperature reached the protein denaturation temperature (about 65° C.) via ultrasonic irradiation. When the duration of ultrasonic irradiation was 1 ms, however, whitening observed immediately after irradiation substantially disappeared via treatment at 4° C. This indicates that the temperature was not increased. Thus, information concerning ultrasonic intensity and information concerning temperature increase can be obtained via optical observation of the ultrasonic phantom of the present invention immediately after ultrasonic irradiation and via further optical observation thereof after cooling to lower temperatures. Separately, another experiment was carried out by varying the temperature of the low-temperature treatment to −20° C. to 10° C. and varying the duration of treatment from 10 minutes to 3 hours. Substantially the same results were obtained.

Example 1

Example of Phantom Containing a Gel with Differing Sensitivity to Ultrasound Beams at, in Front of, and Behind the Focal Area of Ultrasonic Irradiation Hereafter, an example of the present invention is described with reference to FIG. 6 and FIG. 7. FIG. 6 shows an outer frame of the phantom. The outer frame of the phantom comprises an outer frame body 1, an acoustic window 2 for ultrasonic irradiation, a window 3 for observing the results of ultrasonic irradiation, and a preventive layer 4 for ultrasonic reflection. FIG. 7 shows an acrylamide gel comprising droplets sealed therein, which is a phantom body. The phantom body comprises a gel 5 for the front of the focal area, a gel 6 for the focal area, and a gel 7 for the back of the focal area. At the time of use, gels 5, 6, and 7 are first prepared, the gels are mounted on the outer frame shown in FIG. 6, and the phantom is sealed with a lid that is not shown. When used as a phantom, an ultrasonic source for assaying the dose is brought into close contact with the acoustic window 2 for ultrasonic irradiation to apply ultrasound beams, and the results are observed through the window 3 for observing the results of ultrasonic irradiation. When the ultrasonic source cannot be brought into close contact with the acoustic window 2 for ultrasonic irradiation, the phantom and the ultrasonic source can be placed into a tank so as to apply ultrasound beams to the phantom. Alternatively, a space between the acoustic window 2 for ultrasonic irradiation and the ultrasonic source may be filled with an acoustic coupling agent such as acoustic jelly to irradiate the phantom with ultrasound beams. As an embodiment of the present example, the focal area of the ultrasonic source (i.e., an area including a focal point of ultrasonic irradiation) is irradiated with ultrasound beams with higher intensity than the ultrasound beams of interest, and the areas in front of and behind the focal area are irradiated with ultrasound beams with lower intensity than the ultrasound beams of interest. In order to confirm such irradiation, for example, a gel 5 for the front of the focal area and a gel 7 for the back of the focal area may each comprise large droplets of Test Example 3 in amounts of 50% or more by weight. The gel 6 for the focal area may comprise large droplets of Test Example 3 in amounts of 0% to 10% by weight. Use of such gels enables inspection of whether the ultrasonic intensity is approximately 100 W/cm$^2$ or higher at the focal area and of whether it is lower than 40 W/cm$^2$ at areas in front of and behind the focal area.

Example 2

Example of Phantom for Estimating the Ultrasonic Intensity at the Focal Area of Ultrasonic Irradiation Hereafter, an example of the present invention is described with reference to FIG. 8 and FIG. 9. FIG. 8 shows an outer frame of the phantom. The outer frame of the phantom comprises an outer frame body 1, and a window 2 for ultrasonic irradiation. FIG. 9 shows a gel comprising droplets sealed therein, which is a phantom body. The gel is a laminate of gels 8-1 to 2n with different sensitivities to ultrasound beams. At the time of use, the gel shown in FIG. 9 is mounted on the outer frame shown in FIG. 8, and the phantom is sealed with a lid that is not shown. When used as a phantom, the ultrasonic source, which is the target of measurement, is brought into close contact with the acoustic window 2 for ultrasonic irradiation, and the ultrasonic source is moved while sequentially applying ultrasound beams to gel in the descending order of sensitivity to ultrasound beams. In order to modify the sensitivity to ultrasound beams, gels comprising large droplets and small droplets at different percentages should be prepared as demonstrated in Test Example 4.

Example 3

Figure 7:
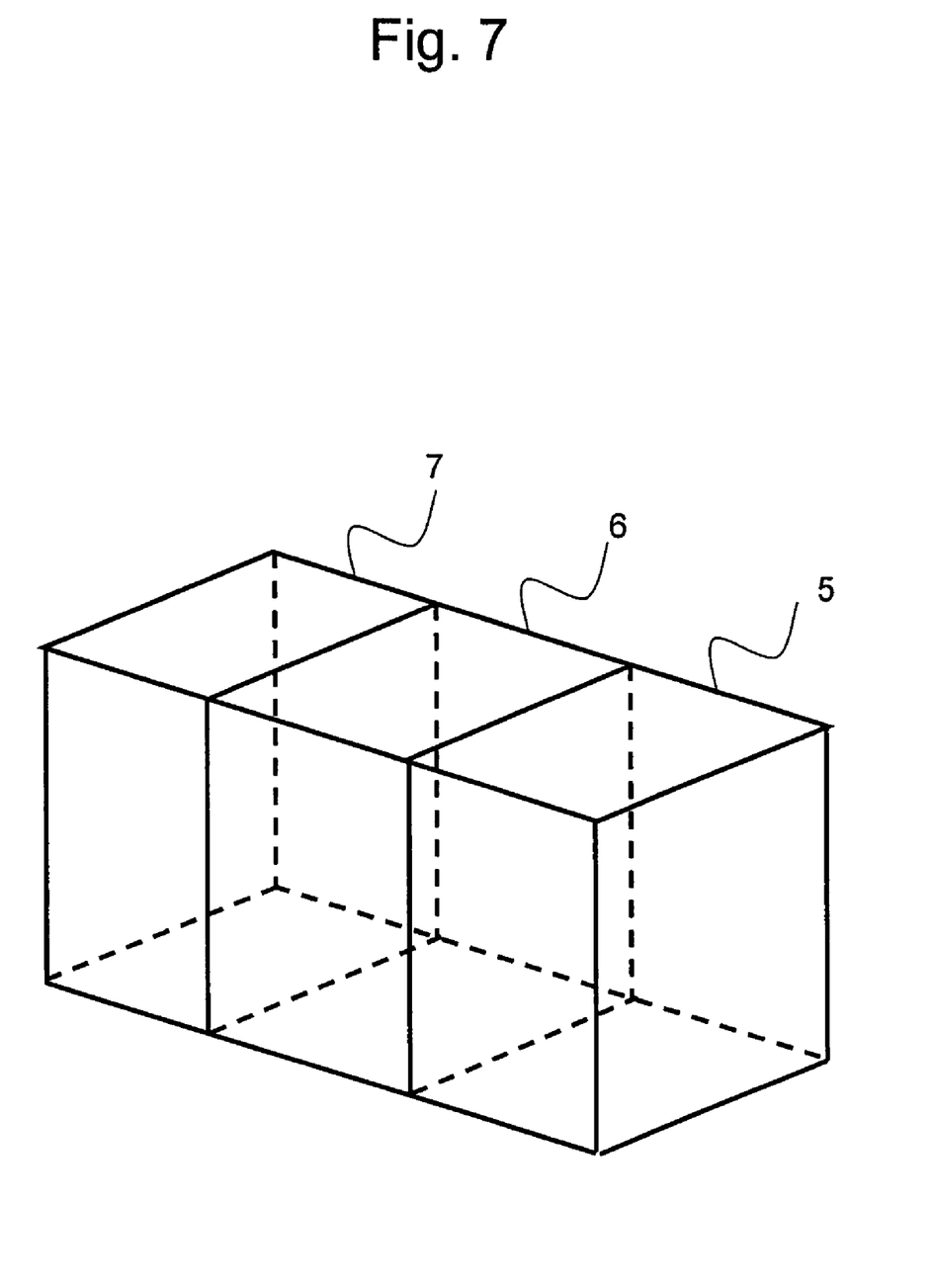
FIG. 7 shows a gel, which is the ultrasonic phantom body according to an example of the present invention.
Figure 10:
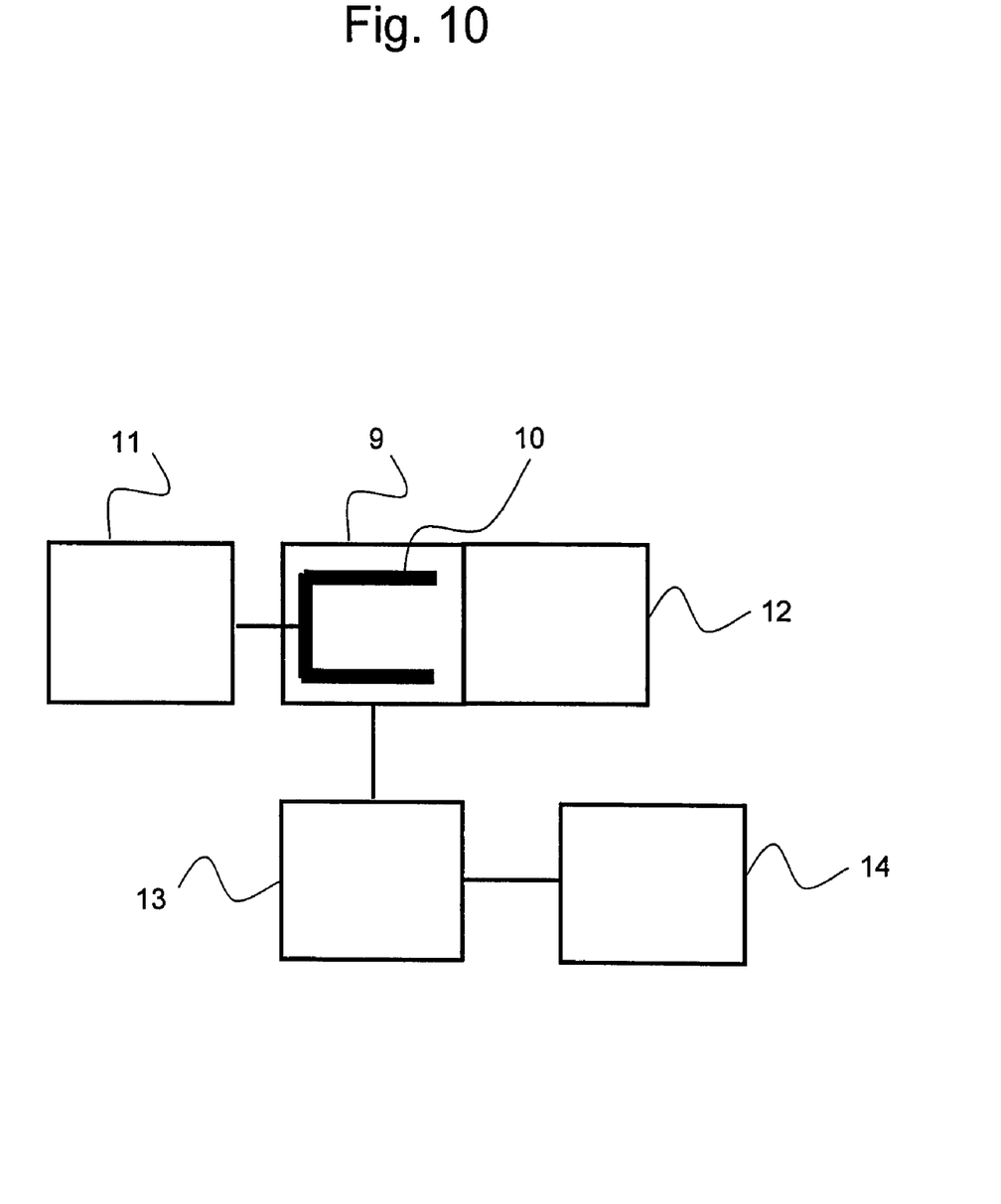
FIG. 10 shows an example of an apparatus used in combination with the ultrasonic phantom of the present invention.

Example of Apparatus for Obtaining Information Concerning Ultrasonic Intensity and Temperature Increase Used in Combination with Ultrasonic Phantom Hereafter, an example of the present invention is described with reference to FIG. 10. The apparatus used in combination with the ultrasonic phantom in the present example comprises a phantom holding portion 9, a temperature regulating portion 10, a temperature controlling portion 11, a phantom photographing portion 12, an apparatus controlling portion 13, and a display 14. The phantom holding portion 9 holds a phantom as shown in FIG. 7 or 9 and it can apply ultrasound beams. The temperature regulating portion 10 is constructed so as to regulate the temperature of the phantom placed in the phantom holding portion 9 in a temperature range between −10° C. and 40° C., and it is controlled by the temperature controlling portion 11. The phantom photographing portion 12 is constructed so as to photograph the entire phantom, and the results of photographing are transferred to the apparatus controlling portion 13. The apparatus controlling portion 13 is constructed so as to control the temperature controlling portion 11 and the phantom photographing portion 12, to retain the phantom image photographed by the phantom photographing portion 12, and to perform image processing such as binarization or superposition. The display 14 is constructed so as to display a phantom image. The apparatus controlling portion 13 is constructed so as to determine the temperature at the time of ultrasonic irradiation and the temperature and the duration of low-temperature treatment upon user input. The controlling portion 13 transmits a control signal to the phantom photographing portion 12 after ultrasonic irradiation and low-temperature treatment to command the initiation of photographing.

Industrial Applicability

The ultrasonic phantom of the present invention can respond to ultrasonic beams of short pulses to ultrasonic beams of continuous waves and allows visualization of the ultrasonic intensity applied in response to different ultrasonic intensities. The present invention is useful in various diagnostic and therapeutic techniques in the medical field.

The invention claimed is:

1. A phantom comprising:
    a thermally-irreversible gel;
    a contrast medium disposed in the gel, the contrast medium comprising first liquid droplets having an average particle diameter of 0.5 µm or smaller and second liquid droplets having an average particle diameter greater than 0.5 µm and 20 µm or less, wherein, upon ultrasonic irradiation, at least one of the first liquid droplets and the second liquid droplets shift from a liquid phase to a gas phase; and
    a container that accommodates the thermally-irreversible gel and the contrast medium.

2. The phantom according to claim 1, wherein the second droplets account for 50% or more of the contrast medium by weight.

3. The phantom according to claim 1, wherein the thermally-irreversible gel is composed of a first area, which includes the focal point of the ultrasonic irradiation, and a second area, which does not include such focal point, and in the first area, the second droplets account for 50% or more of the contrast medium by weight.

4. The phantom according to claim 1, wherein the thermally-irreversible gel is composed of a first area, which includes the focal point of the ultrasonic irradiation, and a second area, which does not include such focal point, and in the second area, the second droplets account for 0% to 10% of the contrast medium by weight.

5. The phantom according to claim 1, wherein the contrast medium comprises an outer envelope comprising a surfactant and a droplet stabilizer.

6. The phantom according to claim 1, wherein the volatile liquid is any member selected from among the group consisting of fluorotrichloromethane, dibrodifluoromethane, 2-bromo-1,1,1-trifluoroethane, 2-methylbutane, perfluoropentane, 1-pentene, pentane, 2H,3H-perfluoropentane, perfluorohexane, hexane, 1H-perfluorohexane, perfluoroheptane, heptane, and perfluorooctane.

7. The phantom according to claim 1, wherein the contrast medium shifts from a gas phase to a liquid phase upon cooling after ultrasonic irradiation.

8. The phantom of claim 1, wherein the thermally-irreversible gel comprises a matrix into which the first liquid droplets and second liquid droplets are incorporated.

9. The phantom according to claim 1, which further comprises an indicator of temperature increase accommodated in the thermally-irreversible gel.

10. The phantom according to claim 9, wherein the indicator of temperature increase comprises proteins.

11. A method for assaying ultrasonic irradiation conditions comprising the steps of:
    applying ultrasound beams to a phantom comprising a thermally-irreversible gel, an indicator of temperature increase accommodated in the gel, and a contrast medium that shifts from a liquid phase to a gas phase upon ultrasonic irradiation and shifts from a gas phase to a liquid phase upon cooling after ultrasonic irradiation;
    attaining first detection results by optically detecting denaturation of the indicator of temperature increase resulting from ultrasonic irradiation and a shift of the contrast medium from a liquid phase to a gas phase;
    cooling the phantom following the step of ultrasonic irradiation;
    attaining second detection results by optically detecting a shift of the contrast medium from a gas phase to a liquid phase following the step of cooling; and
    comparing phase shifts of the contrast medium based on the first and the second detection results to assay the ultrasonic irradiation conditions based on the results of comparison.

12. The method for assaying ultrasonic irradiation conditions according to claim 11, wherein the step of cooling comprises cooling the phantom to −20° C. to 10° C.

* * * * *